July 31, 1962 W. W. JUKKOLA 3,047,365
TEMPERATURE CONTROL IN THE FLUIDIZED ROASTING PROCESS OF
SULFIDIC ORES WITH THE BY-PRODUCT RECOVERY OF STEAM
Filed April 13, 1959
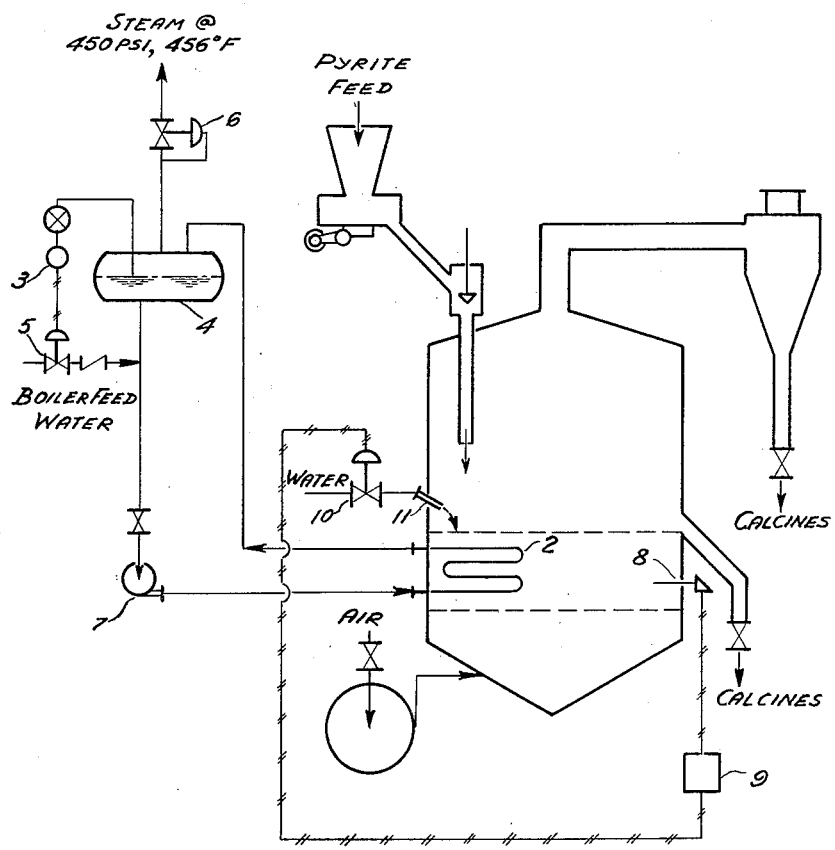
INVENTOR.
WALFRED W. JUKKOLA
BY William S. Henry

United States Patent Office 3,047,365
Patented July 31, 1962

3,047,365
TEMPERATURE CONTROL IN THE FLUIDIZED ROASTING PROCESS OF SULFIDIC ORES WITH THE BY-PRODUCT RECOVERY OF STEAM
Walfred W. Jukkola, Westport, Conn., assignor to Dorr-Oliver Incorporated, Stamford, Conn., a corporation of Delaware
Filed Apr. 13, 1959, Ser. No. 805,825
5 Claims. (Cl. 23—179)

This invention relates to the contacting of solids with gases in accordance with the so-called solids fluidization technique. The invention is of primary importance in connection with the roasting of sulfide ores, such as pyrites, for the production of sulfur dioxide gas and iron oxide calcines, however, it is equally applicable to temperature control in the fluidized roasting of any finely divided materials which react exothermically at roasting temperatures.

Fluidization may be described as that technique in which a mass of finely-divided solids (say up to ½″ or so) is suspended in an uprising gas stream under such conditions that the mass expands and is agitated so that it behaves very much like turbulently boiling water. Under these conditions the solids are in turbulent zig-zag motion throughout. Such a suspended mass is referred to as a fluidized bed.

Gas solids contact in a fluidized bed is amazingly efficient and the mixing is so thorough that, for all practical purposes, uniformity of temperature and chemical composition exists throughout the bed. By its very nature, a fluidized bed must consist predominantly of completely treated material. Incoming feed material is immediately distributed throughout the bed which serves as a heat reservoir and a feed distributing means thus the feed material almost instantly assumes the temperature of the fluidized mass as does the uprising gas so that when the feed and the treatment gas contact each other they are already at reaction temperatures.

The fluidized roasting of sulfides is an exothermic reaction which releases a considerable quantity of heat. If the feed rate and sulfur quantity in the feed are sufficiently great then the excess heat released must be removed from the bed otherwise the temperatures will exceed the fusion point of the roasted particles in the bed thereby causing these particles to fuse with a consequent defluidization of the entire bed.

It is therefore necessary to control the temperature of the bed in order to prevent fusion of the bed particles. Temperature control is also necessary in order to maintain optimum operating conditions. Generally speaking the bed temperature for sulfide roasting should be in the range from 1650° F. to 1750° F. If the temperature is decreased much below this point, a considerable loss of sulfur as $SO_3$ will occur due to change in the $SO_2$—$O_2$—$SO_3$ equilibrium.

It is known to extract heat from a fluidized bed by means of coils or other heat exchange elements immersed in the bed. The coolant flowing through the coils may be water and the heat absorbed used for the production of steam. However, these coils are inflexible in that they are normally designed for optimum heat extraction at fixed temperature differentials between the bed and coolant medium. Any variation in the bed temperature upsets these optimum conditions and results in improper functioning. Moreover, cooling coils are not sensitive control means because they cannot be adapted readily to wide variations in heat production to maintain a constant bed temperature such as is required for most efficient desulfurization of the ore.

This invention proposes to overcome this disadvantage by removing only the major portion of the heat by coils and then removing the remainder of the heat, and consequently attaining final temperature control, by direct heat removal means, such as water injection or excess air or both, or perhaps by the addition of substances which absorb heat in undergoing endothermic reactions in the bed—advantageously such materials should yield $SO_2$ gas upon decomposition, for which purpose one can employ a sulphate material not incompatible with the ore being roasted, sulfuric pickling liquor and like substances. The cooling by the addition of such materials may provide the sole means of absorbing any balance of heat of excess reaction not absorbed by the heat exchange elements or it may supplement the heat absorbing activity achieved by water injection or excess air.

For example, a fluidized solids furnace designed to roast 100 metric tons per day of 46½% sulfur pyrites should be operated at a temperature of 1650° F. The desired steam temperature from the coils is 460° F. Roasting with a slight excess of air (10%) the excess heat of reaction generated in the chamber is 8,620,000 B.t.u.'s per hour. The coils absorb 6,900,000 B.t.u.'s per hour, water injected directly into the bed absorbs 1,720,000 B.t.u.'s per hour as latent and sensible heat. This quantity of heat absorbed by the injected water, is carried from the reactor in the exit gases and the sensible heat content is recovered in a waste heat boiler. Under the foregoing conditions the steam recovery is 1.40 tons of steam per ton of pyrite. In the same reactor operating under the same conditions but at a feed rate of only 80 metric tons per day, the excess heat of reaction is 6,900,000 B.t.u.'s per hour. This is entirely removed by the coils and no water injection is required. Under these conditions steam recovery is 1.51 tons of steam per ton of pyrites. In the same reactor under conditions where the feed rate is 120 metric tons per day the excess heat of reaction is 10,350,000 of which 6,900,000 B.t.u.'s per hour are removed by coils and 3,450,00 by water injection. Under these conditions 1.34 tons of steam are recovered for each ton of pyrite roasted.

When roasting pyrite, it is generally desirable to operate the reactor at nearly the maximum possible temperature and minimum amount of excess air in order to obtain maximum $SO_2$ production while having a low $SO_3$ content in the gases, also, the high temperature favors maximum by-product steam recovery. For most pyrites, optimum roasting results are obtained when the reactor is operated at a temperature of about 900° C. and 10% excess air. A slight increase in temperature, say 25° C., is usually sufficient to cause the bed to defluidize due to fusion or softening of the particles. On the other hand, a drop in temperature below the optimum tends to promote the formation of $SO_3$ since the equilibrium between $SO_2$, $SO_3$ and $O_2$ is a function of temperature.

A study of the $SO_2$, $SO_3$ and $O_2$ equilibrium also indicates the desirability of using a minimum amount of excess air when low $SO_3$ is desired. However, in practice it has been found that usually 5 to 10% excess air is required to obtain the desired removal of sulfur from the calcines.

The following reaction shows the heats of reactions for pyrite and pyrrhotite when roasting with less than 5% excess air and more than 5% excess air.

LESS THAN 5% EXCESS AIR $FeS_2 + 8/3 O_2 \rightarrow 1/3 Fe_3O_4 + 2SO_2$    2860 B.t.u./# $FeS_2$
$FeS_{1.18} + 1.85 O_2 \rightarrow 1/3 Fe_3O_4 + 1.18 SO_2$
    2850 B.t.u./# $FeS_{1.18}$

MORE THAN 5% EXCESS AIR $FeS_2 + 11/4 O_2 \rightarrow 1/2 Fe_2O_3 + 2SO_2$    2995 B.t.u./# $FeS_2$
$FeS_{1.18} + 1.93 O_2 \rightarrow 1/2 Fe_2O_3 + 1.18 SO_2$
    3020 B.t.u./# $FeS_{1.14}$ In roasting a pyrite or pyrrhotite only a small portion of this heat of reaction is needed for bringing the reactants and products up to the operating temperature. Thus to maintain the unit at the desired operating temperature, all of the excess heat of reaction must be removed by some means. In all units, some heat losses will occur. However, according to this invention, the bulk of excess heat is removed by use of steam coils and, to obtain operating flexibility, the remainder of the excess heat is removed by direct injection of water into the bed.

The objects and advantages of this invention over the prior art, illustrated by German Patents 15,681 published April 28, 1955, and 18,198 published March 30, 1954, in which the heat exchange coils are moved relative to the fluidized bed and vice-versa are manifest. Other objects and advantages are as follows:

A constant amount of steam at constant pressure and temperature is produced regardless of operating (roasting) rate between the ranges of say 80% to 120% of design capacity.

With the system, the by-product steam production from the combination of coils and waste heat boiler will be 90% + of the maximum possible when using only steam coils and waste heat boiler. Thus considerable operating flexibility is obtained with sacrifice of less than 10% in by-product steam production.

Temperature is automatically and easily maintained at a fixed point.

Operating temperature can be readily changed. This merely requires changing the set-point on the temperature controller from one number to another (just turning a dial).

Variations in the moisture content of the feed due to rains, seasonal changes, etc. has little effect on the operation of the roaster. The temperature controller would automatically compensate for the water introduced with the feed.

Using the combined temperature control system, it is not necessary to know accurately all physical and chemical properties of the ore in order to design an operable system because the coils do not have to be designed and sized to remove the exact amount of excess heat produced in the roasting operation. This also makes it possible for the operator to have selection of raw material based on economic consideration rather than strictly chemical properties of the ore.

A roasting system can be designed to operate at say 80% to 120% of design capacity without making any equipment alternations. Thus the production can be readily adjusted to demand.

The drawing diagrammatically illustrates a control system for fluidized roasting using a combined steam coil heat exchanger and direct water injection for the temperature control of the fluidized bed with production of steam at constant temperature and pressure and in maximum quantity consistent with optimum flexibility of temperature control of the reactor.

The steam coils 2 are sized so that they would remove about 80% of the excess heat of reaction when the reactor 1 is operated at its design rate and at optimum operating conditions. The operation of these coils merely requires passing water through the coils at a given rate which is determined by the heat exchanger requirement of a given reactor. Since the coils are installed in an atmosphere conducive to the formation of $H_2SO_4$, the operating conditions of the steam system must be such that $H_2SO_4$ will not condense on the coil surfaces, causing corrosion and subsequent failure of the tubes. As a result, the steam system is designed to operate at a pressure of about 450 p.s.i.g. and temperature 456° F. so that the temperature of the coils is maintained above the $H_2SO_4$ dew point at all times.

A preferred steam circuit consists of a steam drum with separators, pressure regulators, etc., a water level controller, water make-up system, circulating pump, and steam coils. The level controller 3 automatically controls the input of feed water to a steam drum 4 in the system by regulation of the diaphragm valve 5. The by-product steam is automatically discharged through the pressure regulator 6. This discharge rate will be essentially constant for a given system. The saturated steam will be discharged at a pressure of about 450 p.s.i.g. and 456° F. If super heated steam is desired, the saturated steam can be passed through superheater coils installed in a waste heat boiler or in the reactor. Except for the water make-up control rate, and steam pressure regulation, no other controls are involved in the system. The water circulation rate through the coils is maintained constant by the circulation pump 7 or the system can be designed for natural circulation.

The actual temperature control in the reactor is carried out by the direct water injection system. The thermocouple 8 senses the temperature in the fluid bed and sends an electrical impulse to the temperature controller 9. The temperature controller compares the magnitude of the impulse with a set point and if higher or lower, changes the pneumatic pressure to the diaphragm valve 10 which regulates the flow rate of water to the water injection nozzle 11. This latter item may be merely a small diameter pipe projecting inside of the reactor. The nozzle may be inclined slightly downward and installed above the level of the fluid bed. Although the cooling water can be sprayed or spread out over a wider area of the bed by means of air or special nozzles, this is not an important feature of the system.

A number of alternate methods are available for controlling the rate of water injection to the bed based on the temperature variations. However, the preferred system is similar to that shown in which electrical impulses are compared and then converted to pneumatic pressures for actual control. These systems are capable of easily and automatically maintaining the bed temperature within ±10° F. of the set point.

It will be evident from the foregoing that the method and apparatus according to this invention provides a simple reliable and inexpensive system for obtaining temperature control of a fluidized reactor with the necessary flexibility required for a wide range of operating conditions while providing a source of steam at constant temperature, pressure and quantity.

This application is a continuation-in-part of application Serial No. 586,651, filed May 23, 1956, now abandoned.

I claim:

1. In the roasting of sulfidic ores in a fluidized bed reaction chamber with the fluidized material in the bed undergoing exothermic reaction with the fluidizing air to produce $SO_2$ containing gases, the method of maintaining a required reaction temperature at fluctuating load rates in the bed by the controlled withdrawal of excess heat from the bed with byproduct steam generation by said heat, characterized thereby that a predetermined major portion of the excess exothermic heat is removed from the bed at a constant rate by means of heat exchange elements having predetermined heat transfer area located in the bed whereby sufficient water is circulated at a constant rate through said elements to produce saturated steam with a portion of the water passing through said elements being continuously converted into saturated steam with the result that heat removal from the bed is effected at a constant rate by said elements, while the remainder of said excess heat is removed directly and instantaneously by feeding into the bed injection water while controlling the rate of feed thereof into said bed in accordance with temperature changes in the bed, thus maintaining the reaction temperature constant irrespective of load changes in the bed, and while maintaining a constant differential between the temperature of the reacting fluidized material and the surface temperature of the exchange elements by holding the pressure of the saturated steam constant at a point at which the corresponding temperature of the saturated steam will keep the temperature of the elements themselves sufficiently high to prevent corrosion of said elements by $H_2SO_4$ incident to the roasting reaction in the bed, and thus maintaining the byproduct steam generation at a uniform rate, with uniform temperature and uniform pressure of the saturated steam, while maintaining predetermined reaction temperature in the bed.

2. The method according to claim 1, wherein the steam pressure and temperature are maintained substantially at 450 p.s.i.g. and at 456° F. respectively.

3. The method according to claim 1, wherein said injection water is introduced in a direction from above into the surface of the bed.

4. The method according to claim 1, wherein the saturated steam is subjected to superheating by the roaster gases.

5. The method according to claim 1, wherein the saturated steam is subjected to superheating by the roaster gases, and that the roaster gases are then further utilized in a waste heat boiler.

References Cited in the file of this patent
UNITED STATES PATENTS

| | | |
|---|---|---|
| 2,242,763 | Smith | May 20, 1941 |
| 2,493,498 | Peery | Jan. 3, 1950 |
| 2,506,317 | Rex | May 2, 1950 |
| 2,761,764 | Johannsen et al. | Sept. 4, 1956 |
| 2,853,455 | Campbell et al. | Sept 23, 1958 |
| 2,889,202 | Johannsen et al. | June 2, 1959 |